(12) United States Patent
Grollman

(10) Patent No.: US 10,850,398 B2
(45) Date of Patent: Dec. 1, 2020

(54) INFINITE ROBOT PERSONALITIES

(71) Applicant: MISTY ROBOTICS, INC., Boulder, CO (US)

(72) Inventor: Daniel H. Grollman, Boulder, CO (US)

(73) Assignee: MISTY ROBOTICS, INC., Boulder, CO (US)

( * ) Notice: Subject to any disclaimer, the term of this patent is extended or adjusted under 35 U.S.C. 154(b) by 217 days.

(21) Appl. No.: 15/818,133

(22) Filed: Nov. 20, 2017

(65) Prior Publication Data

US 2018/0326589 A1    Nov. 15, 2018

Related U.S. Application Data

(60) Provisional application No. 62/505,031, filed on May 11, 2017.

(51) Int. Cl.
| | |
|---|---|
| *B25J 11/00* | (2006.01) |
| *G06N 5/02* | (2006.01) |
| *G06N 3/00* | (2006.01) |
| *G06N 7/00* | (2006.01) |

(52) U.S. Cl.
CPC ......... *B25J 11/0015* (2013.01); *B25J 11/001* (2013.01); *G06N 3/008* (2013.01); *G06N 5/02* (2013.01); *G06N 7/005* (2013.01)

(58) Field of Classification Search
CPC ..... B25J 11/0015; B25J 11/001; G06N 3/008; G06N 5/02; G06N 7/005
See application file for complete search history.

(56) References Cited

U.S. PATENT DOCUMENTS

| | | | | |
|---|---|---|---|---|
| 2011/0004577 | A1* | 1/2011 | Jung | G06N 3/004 |
| | | | | 706/12 |
| 2014/0093849 | A1* | 4/2014 | Ahn | G06N 3/008 |
| | | | | 434/236 |
| 2015/0100157 | A1 | 4/2015 | Houssin et al. | |
| 2015/0165625 | A1 | 6/2015 | Michalowski et al. | |

FOREIGN PATENT DOCUMENTS

| | | |
|---|---|---|
| KR | 10-2012-0111453 A | 10/2012 |
| KR | 10-2013-0091364 A | 8/2013 |

OTHER PUBLICATIONS

International Search Report and Written Opinion for International Patent Application No. PCT/US2018/031572, dated Aug. 23, 2018, 14 pages.
PCT International Preliminary Report on Patentability in Application PCT/US2018/031572, dated Nov. 21, 2019, 11 pages.

* cited by examiner

*Primary Examiner* — Ian Jen

(57) ABSTRACT

Aspects of the present disclosure generally relate to providing a large variety of robot personalities. In certain aspects, a robot personality may be represented as a personality location in a personality space, which may be a continuous unidimensional or multidimensional space. The dimensions of the personality space may be based on one or more factors. Based on the personality location, an affective state may be maintained for the robot, which may be represented as an affect location in an affect space. The affect location may be updated based on one or more inputs. Accordingly, robot expressions may be influenced based upon the affect location, which in turn is affected by the personality of the robot in the personality space.

20 Claims, 7 Drawing Sheets

INFINITE ROBOT PERSONALITIES

CROSS-REFERENCE TO RELATED APPLICATIONS

This application claims priority to U.S. Provisional Application No. 62/505,031, titled "Infinite Robot Personalities," filed on May 11, 2017, the entire disclosure of which is hereby incorporated by reference in its entirety.

BACKGROUND

Robot personalities are generally manually created, comprising hand-coded or scripted behaviors, animations, movements, and/or sounds. As a result, many robotic devices have fixed personalities drawn from a finite set of personalities. While the personality of some robotic devices may be customized, the type of customization is generally limited. Further, a large amount of manual effort may be required to create a new robot personality for such robotic devices.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure generally relate to providing a large variety of robot personalities. In certain aspects, a robot personality may be represented as a personality location in a personality space, which may be a continuous unidimensional or multidimensional space. The dimensions of the personality space may be based on one or more factors. The personality location may be used to maintain an affective state for the robot, which may be represented as an affect location in an affect space. The affect location may be updated based on one or more inputs. Accordingly, robot expressions may be influenced based upon the affect location, which in turn is affected by the personality of the robot in the personality space.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1A:
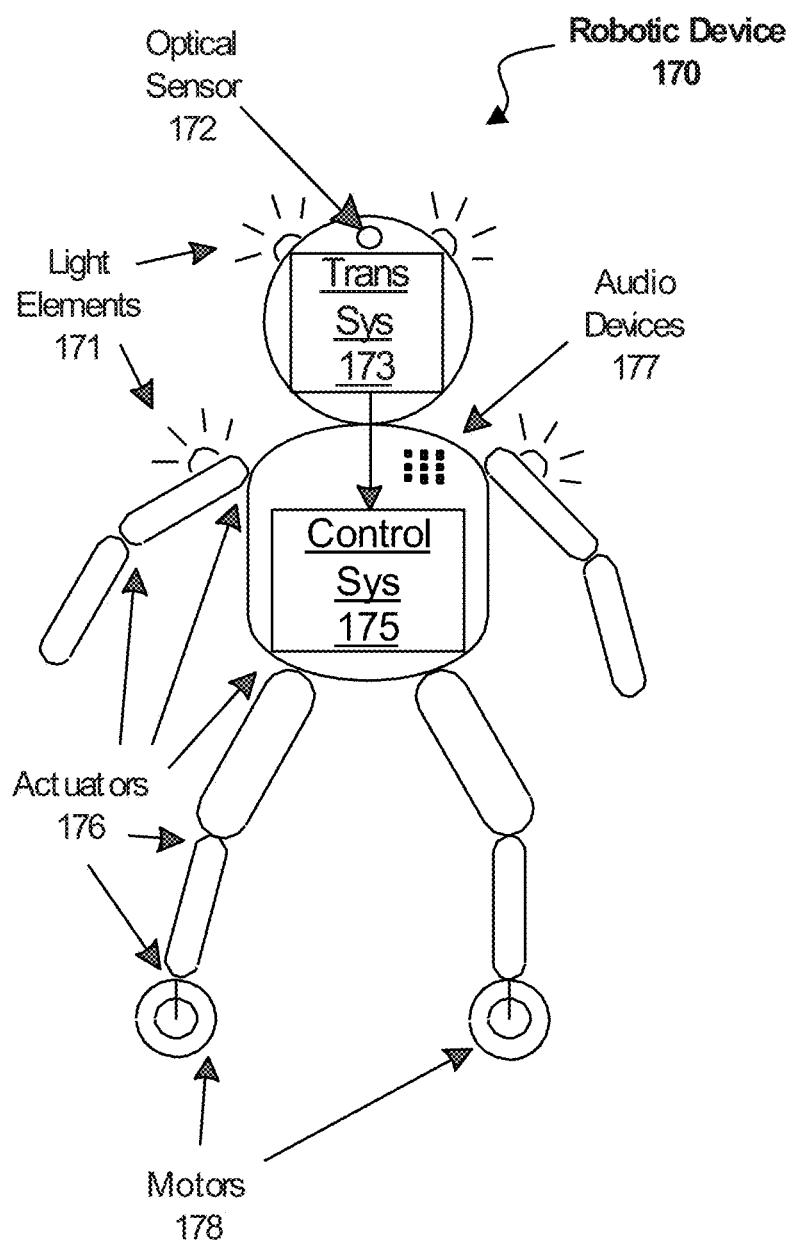
FIG. 1A depicts an example of a robotic device.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Currently, robot personalities and resulting behaviors and/or expressions are individually hand-created by designers and developers, thereby requiring a high degree of manual content creation. Accordingly, providing a new personality may comprise manually designing and coding additional content for the robot. Thus, there may be a high cost associated with traditional techniques of developing a robot that has multiple robot personalities available. Aspects of the present disclosure, among other benefits, remove the need for such a high degree of additional work to create new robot personalities.

Accordingly, the present disclosure provides systems and methods for providing infinite robot personalities. As an example, the personality of a robotic device may be represented by a personality location in a personality space. The personality space may be unidimensional or multidimensional, such that the personality of the robot may be based on one or more factors as may be described by the personality location in the personality space. In another example, the personality space may be continuous or may be comprised of a set of discrete locations. In some examples, the personality space may be bounded and/or infinite. As described in further detail herein, the personality of the robot (e.g., as defined by the personality location) may impact the affective state of the robot and, by extension, the actions, behaviors, and other expressions of the robot.

In examples, the affective state of the robot may be represented by an affect location in an affect space. In an example, the affect space may be unidimensional or multidimensional, such that the affective state of the robot may be based on one or more factors, as may be described by the affect location in the affect space. In another example, the affect space may be continuous or may be comprised of a set of discrete locations. In some examples, the affect space may be bounded and/or infinite. The affect location in the affect space may change, thereby representing a change in the affective state of the robot. As an example, the affective state of a robot may be comprised of an emotion, a mood, and/or an attitude, among others. In some examples, the affect location may change based on the personality of the robot, such that the personality location of the robot may affect the manner in which the affective state of the robot changes within the affect space (e.g., as time passes, in response to inputs, etc.).

When the robot generates an expression, the affective state of the robot (e.g., as may be represented by an affect location in an affect space) may be used to determine various attributes of the expression (e.g., which type of expression, how the expression is performed, etc.). In an example, an action space may be used to model possible expressions for a robot. The action space may be unidimensional or multi-dimensional, such that various possible expressions for the robot may be associated with different locations in the action space based on one or more factors. In another example, the action space may be continuous or may be comprised of a set of discrete locations. In some examples, the action space may be bounded and/or infinite. Thus, expressions of the robot may be affected by the current affective state of the robot, which in turn may be affected by the personality of the robot. Accordingly, by varying the personality location in personality space, it may be possible to algorithmically generate a wide variety of robot personalities, which may cause the robot to exhibit different affective states and expressions as compared to similar robots having different personalities.

FIG. 1A depicts an example of a robotic device 170. The terms "robotic device" and "robot" are used interchangeably herein. Further, it will be appreciated that while examples herein are described with respect to a robot, similar techniques may be utilized by any of a wide array of other computing devices, including, but not limited to, personal computing devices, desktop computing devices, mobile computing devices, and distributed computing devices.

The robotic device 170 can move in a plurality of manners and can provide feedback through a variety of output mechanisms, so as to convey expressions. For example, the robotic device 170 may include light elements 171 and audio devices 177. The light elements 171 may include LEDs or other lights, as well as displays for displaying videos or other graphical items. The audio devices 177 may include speakers to provide audio output from the robot 170. A plurality of actuators 176 and motors 178 may also be included in the robot 170 to allow the robot to move as a form of communication or in response to user input. In addition, a plurality of input devices may also be included in the robot 170. For example, the audio devices 177 may also include a microphone to receive sound inputs. An optical sensor 172, such as a camera, may also be incorporated into the robot 170 to receive images or other optical signals as inputs. Other sensors, such as accelerometers, GPS units, thermometers, timers, altimeters, or any other sensor, may also be incorporated in the robot 170 to allow for any additional inputs that may be desired.

The robot 170 may also include a transmission system 173 and a control system 175. The transmission system 173 includes components and circuitry for transmitting data to the robot from an external device and transmitting data from the robot to an external device. Such data transmission allows for programming of the robot 170 and for controlling the robot 170 through a remote control or app on a smart-phone, tablet, or other external device. In some examples, inputs may be received through the external device and transmitted to the robot 170. In other examples, the robot 170 may use the transmission system 173 to communicate with an external device over a network (e.g., a local area network, a wide area network, the Internet, etc.). As an example, the robot 170 may communicate with an external device that is part of a cloud computing platform. The control system 175 includes components for controlling the actions of the robot 170. In some examples, the control system 175 comprises components for providing a robot personality, according to aspects disclosed herein.

Figure 1B:
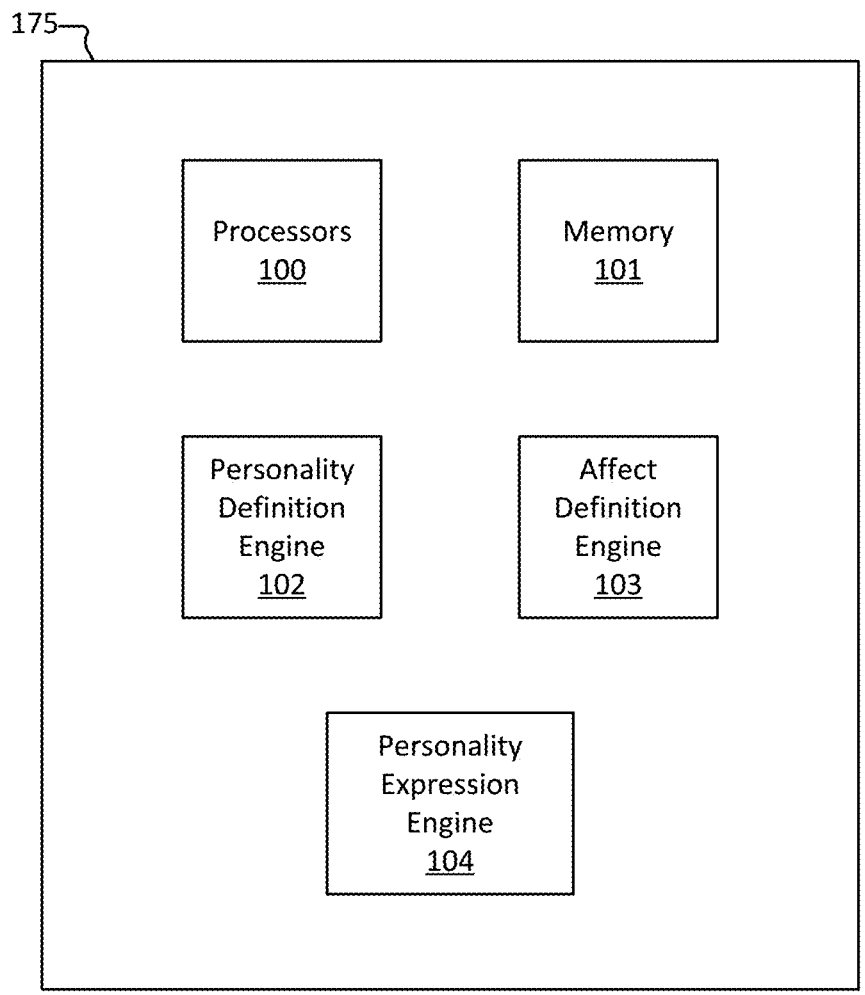
FIG. 1B depicts a more detailed depiction of an example of the control system in the robot.

FIG. 1B depicts a more detailed depiction of an example of the control system 175 in the robot 170. The control system 175 includes one or more processors 100 and a memory 101 operatively or communicatively coupled to the one or more processors 100. The one or more processors 100 are configured to execute operations, programs, or computer executable instructions stored in the memory 101. The one or more processors 100 may be operable to execute instructions in accordance with the robot personality and/or expression technology described herein. Memory 101 may be volatile memory (such as RAM), non-volatile memory (such as ROM, flash memory, etc.), or some combination of the two. Memory 101 may comprise computer storage media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. In one example, memory 101 is operable to store instructions for executing methods or operations in accordance with aspects described herein. The instructions may be stored as software or firmware in the control system 175.

The control system 175 also includes a personality definition engine 102, an affect definition engine 103, and a personality expression engine 104. It will be appreciated that the functionality described herein with respect to the control system 175 and other aspects of the robot 170 may be provided at least in part by an external device in some examples. In an example, a personality may be defined by the personality definition engine 102 as a personality location within a unidimensional or multidimensional personality space, which may be associated with one or more factors (e.g., dimensions). As an example, dimensions of a personality space may comprise factors relating to openness, conscientiousness, agreeableness, extrovertedness, and neuroticism. Accordingly, a personality location within the personality space may be associated with different values and/or weightings for each of the factors. While example factors are discussed herein, it will be appreciated that any of a wide variety of factors may be used as dimensions for a personality space.

The personality defined by the personality definition engine 102 may be preprogrammed or randomly selected when the robot 170 is first powered on. In some examples, certain regions of the personality space may be disabled or otherwise avoided, such that a robot may not have a personality represented by personality locations within such regions. In other examples, a user interface may be provided to a user for evaluating a set of potential personalities or personality types, such that the user may identify a personality and/or personality type preferred by the user. In some examples, the user interface may be part of a website or a mobile application. In such an example, the user may make a selection, provide answers to a questionnaire, or provide other input, which may be used to determine the personality of the robot 170.

In some instances, the personality of the robot 170 may be adjusted. As an example, a user may be able to modify the personality, or may be able to request the personality of the robot 170 be modified. In another example, the personality definition engine 102 may adjust the personality of a robot based upon input received over time. For example, the personality location of the robot 170 may be adjusted in a personality space based upon input received by the robot. Example input may be related to interactions with a user, environmental conditions, and actions performed by the robot, among other input. As an example, a user may provide positive reinforcement to a robot in order to encourage perceived good behavior and/or negative reinforcement to discourage perceived bad behavior, which may eventually cause the personality location of the robot to shift within the personality space, thereby adjusting the personality of the robot.

The affect definition engine 103 may define an affective state for the robot 170. In an example, the affective state of the robot 170 may be represented as an affect location within an affect space, according to aspects disclosed herein. In another example, dimensions of the affect space may comprise factors relating to a psychological model, such as the pleasure, arousal, and dominance model. While example factors are described herein, it will be appreciated that any of a variety of factors may be used to define an affective state. The affect definition engine 103 may use a personality defined by personality definition engine 102 when determining the affective state of the robot 170.

In an example, the affective state defined by the affect definition engine 103 may be determined based on input received by the robot 170 (e.g., interactions with a user, environmental conditions, actions performed by the robot, etc.). The input may be processed by the affect definition engine 103 according to a personality defined by personality definition engine 102, such that different robots with different personalities may respond to the same input differently.

As an example, at least a subset of inputs received by the robot may be assigned anchor locations within the affect space based on the personality defined by the personality definition engine 102. In some examples, an anchor point for an input may be determined based on the personality of a robot. The affect definition engine 103 may use the anchor locations to determine an affective state for the robot 170. For example, the affect definition engine 103 may generate an average location within the affect space based on the anchor points, may determine the affect location based on a selection of one or more anchor points, or may use any of a variety of models as will be described in greater detail below. In other examples, additional anchor locations may be generated within the affect space, such as an anchor location representing a mood for the robot (e.g., an average affective state for the robot over a given time period, a lingering sentiment resulting from an input that is no longer present, etc.). In another example, the determination may comprise evaluating the previous affective state for the robot, such that the determined affective state may shift in a continuous manner.

In other examples, inputs may be used by the affect definition engine 103 to directly modify the affective state of the robot 170, such that an input may be used to determine a change that should be made to the affect location in the affect space. For example, an input may be used to determine a "force," which may be used to update the affect location in the affect space. In an example, a probabilistic model may be used, wherein a probability distribution may be defined within the affect space. For example, the probability distribution may be a zero-mean Gaussian distribution centered on the current affect location in the affect space. An input may be mapped to one or more features of the probability distribution (e.g., an input may affect the variance of the pleasure factor, the variance of the arousal factor, etc.), such that one or more factors of the affect location are varied according to the probability distribution. In another example, only a subset of inputs may be used according to aspects disclosed herein, such that inputs may be randomly or programmatically selected or filtered when determining the affect location in the affect space. While example techniques for generating an affect location in affect space based on one or more inputs are discussed herein, it will be appreciated that any of a variety of other techniques may be used.

The personality expression engine 104 may be used to determine expressions for the robot 170. In an example, an expression may be generated in response to receiving input or based on a current goal for the robot (e.g., an activity that the robot is to perform, resulting from an affective state, etc.), among other reasons. For example, upon receiving input indicative of an interaction with a user, the personality expression engine 104 may determine an expression as a response to the received input. As discussed above, the expression may be determined based on an action space, wherein the action space may be sampled to determine an expression for the robot 170.

In some examples, a region of the action space comprising a class of relevant expressions may be determined, such that expressions within the class may be candidate expressions for the robot to convey. An expression may then be selected from within the class of expressions based on the affective state of the robot 170, as may be defined by affect definition engine 103. In an example, a selected expression may be adapted based on the affective state (e.g., the speed at which an action is performed, the pitch at which a sound is played, etc.) In another example, an intermediate mapping may be used in order to select the expression based on the affective state of the robot 170. For example, the affective state of the robot 170 may be mapped to an expression in the action space using a dance notation, including, but not limited to, Labanotation, Benesh Movement Notation, Eshkol-Wachman Movement Notation, or DanceWriting.

Using Labanotation as an example, the affective state of the robot 170 may be used to determine an action as described by Labanotation. For example, one or more factors of the affect space may be mapped to a direction/level of the expression, a component of the robot for the expression, a duration of the expression, and/or the dynamic quality of the expression. Accordingly, that different locations in the affect space may yield different actions as described by Labanotation. As such, the personality expression engine 104 may select an expression from action space based on the action that is described using Labanotation. It will be appreciated that while example expressions, adaptations, mappings, and notations are discussed herein, other techniques may be used without departing from the spirit of this disclosure.

Figure 2:
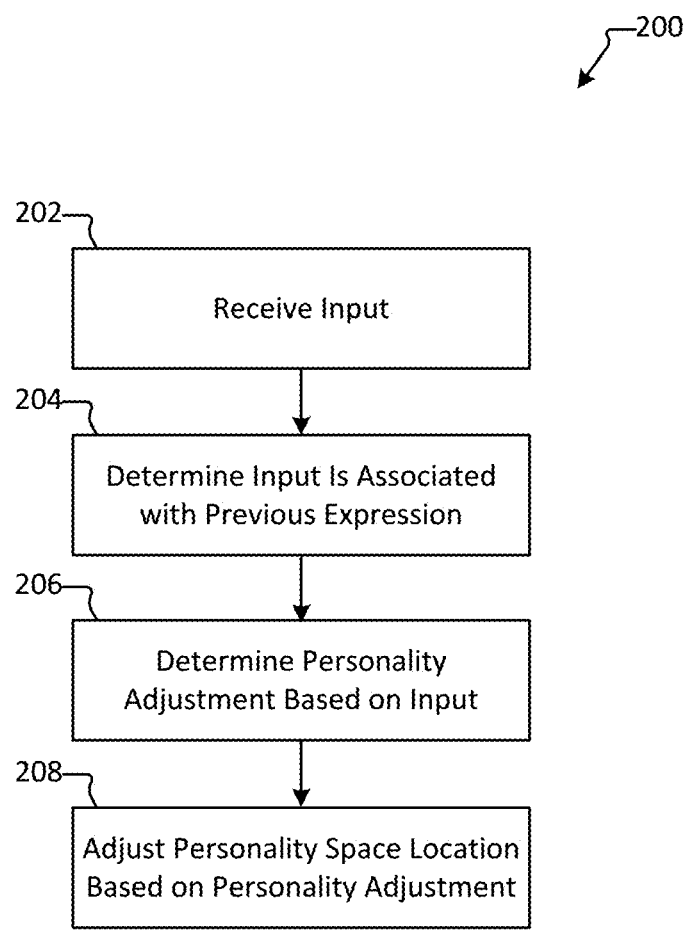
FIG. 2 depicts an example of a method for adjusting the personality of a robot.

FIG. 2 depicts an example of a method 200 for adjusting the personality of a robot. In an example, the method 200 may be executed or otherwise performed by, at least in part, by a personality definition engine, such as the personality definition engine 102 in FIG. 1B. In some examples, the method 200 may be performed in response to a user indication (e.g., based on a user preference to permit gradual personality adaptation, as a result of a request by the user to alter the personality of the robot, etc.). In other examples, the method 200 may be performed automatically by the robot.

For example, the method 200 may be performed periodically or in response to the occurrence of an event, among other examples.

The method 200 begins at operation 202, where an input may be received. In an example, the received input may be an interaction with a user or another device, an environmental condition, audio input, video input, text input, or information indicating a response or expression by the robot. In some examples, the received input may be detected by one or more sensors of the robot, or may be received at a user interface of an external device. While example inputs are described herein, it will be appreciated that any of a variety of other inputs may be received.

Flow progresses to operation 204, where it may be determined whether the input is associated with a previous expression. In some examples, the determination may comprise evaluating one or more expressions by the robot in order to determine whether the input received at operation 202 is associated with at least one of the one or more expressions (e.g., based on temporal proximity, contextual cues, etc.). In other examples, the input may comprise an indication relating to a previous expression (e.g., a user may verbally indicate that a certain behavior is preferable, a negative indication relating to an expression may be received at an external device, etc.).

At operation 206, a personality adjustment may be determined based on the received input. In an example, a personality adjustment may comprise an adjustment to at least one of the factors comprising the personality of a robot in a personality space. In some examples, determining the personality adjustment may comprise analyzing the expression with which the input is associated, the current and/or past affective state of the robot (e.g., as may be represented in an affect space according to aspects disclosed herein), and/or aspects of the received input (e.g., whether the input comprises a positive or negative sentiment, the context in which the input was received, etc.). In other examples, the personality adjustment may be determined based on an analysis of the factors comprising the affective state of the robot in an affect space. For example, if the robot exhibits a high value for one of the factors, it may be inferred that the input was received at least in part due to the affective state of the robot comprising the high value for the factor. Accordingly, the personality adjustment may be determined so as to affect the likelihood of such an affective state occurring again. While example personality adjustment techniques are described herein, it will be appreciated that other techniques may be used without departing from the spirit of this disclosure.

Flow progresses to operation 208, where the location representing the personality of the robot may be adjusted in a personality space based on the personality adjustment. For example, a current personality location for the robot may be adjusted in a continuous unidimensional or multidimensional space. An example equation for personality adjustment is provided below.

$$\rho_{t+1} = f(\rho_t | \varphi)$$

In an example, $\rho_t$ and $\rho_{t+1}$ represent the personality (e.g., as may be represented by personality locations) of a robot at times t and t+1 respectively. Further, $\varphi$ may represent a set of feedback signals, which may indicate feedback that may be used to update the future personality of a robot. Thus, the personality of the robot at time t+1 is a function of the personality of the robot at time t, given a set of feedback signals ($\varphi$). It will be appreciated that this equation is provided as an example, and other techniques may be used to adjust the personality of a robot based on received feedback. The adjustment of the personality location may be used to determine the personality of the robot in the future and/or how the robot will react or respond to future input. Flow terminates at operation 208.

Figure 3:
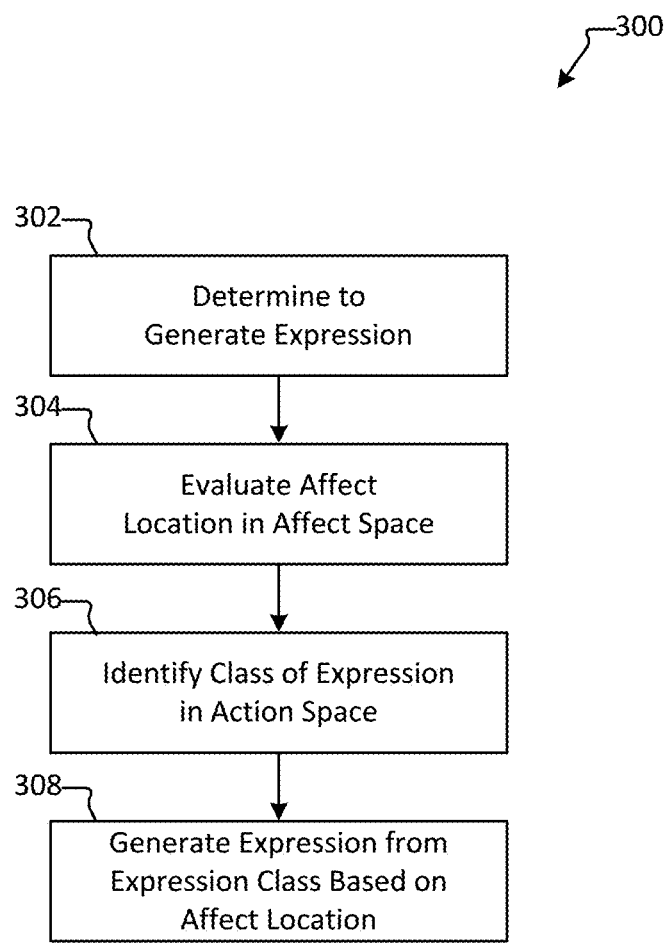
FIG. 3 depicts an example of a method for expressing a robot personality.

FIG. 3 depicts an example of a method 300 for expressing a robot personality. In an example, the method 300 may be executed or otherwise performed by, at least in part, by a personality expression engine, such as the personality expression engine 104 in FIG. 1B. The method 300 begins at operation 302, where it may be determined to generate an expression. In some examples, the determination may be based on a received input, such as an interaction with a user or another device, an environmental condition, audio input, video input, text input, etc. In other examples, the determination may be based on identifying a goal to be performed by the robot or determining that a certain amount of time has elapsed since the robot last performed an expression. It will be appreciated that while example events are described herein, a variety of triggers may be used to determine to generate an expression.

At operation 304, an affect location may be evaluated in an affect space. In an example, the affect location may be defined by an affect definition engine, such as the affect definition engine 103 in FIG. 1B. As described above, the affect space may be a unidimensional or multidimensional space, such that the affect location may be based on one or more factors associated with the dimensions of the space. In some examples, the affect location representing the affective state of the robot may be automatically updated according to the personality of the robot, as was discussed above with respect to the affect definition engine 103 in FIG. 1B. In other examples, evaluating the affect location may comprise determining the affective state of the robot based on one or more inputs according to aspects disclosed herein.

Flow progresses to operation 306, where a class of expression may be identified in an action space. In an example, the action space may be a unidimensional or multidimensional space that is used to model possible expressions for the robot. Accordingly, different regions within the action space may be associated with different classes of expressions, such that expressions within the class may each be similar candidate expressions for the robot to convey. As an example, walking, running, and skipping may each be within the same class or region in the action space, because each of these expressions may be candidate expressions for moving from one place to another. In some examples, identifying the class of expression may comprise evaluating a previously-received input, a goal for the robot to perform, and/or factors that were evaluated when it was determined to generate an expression at operation 302, among other considerations.

Moving to operation 308, an expression may be generated from the identified expression class based on the affect location. In an example, generating the expression may comprise selecting an expression from the expression class based on the affect location from operation 304. In another example, an expression may be adapted based on the affective state of the robot according to aspects disclosed herein. For example, if a skipping expression is determined from the example class of expressions above, the skipping expression may be adapted to be more exaggerated if the affect location indicates the robot is happy. Flow terminates at operation 308.

Figure 4A:
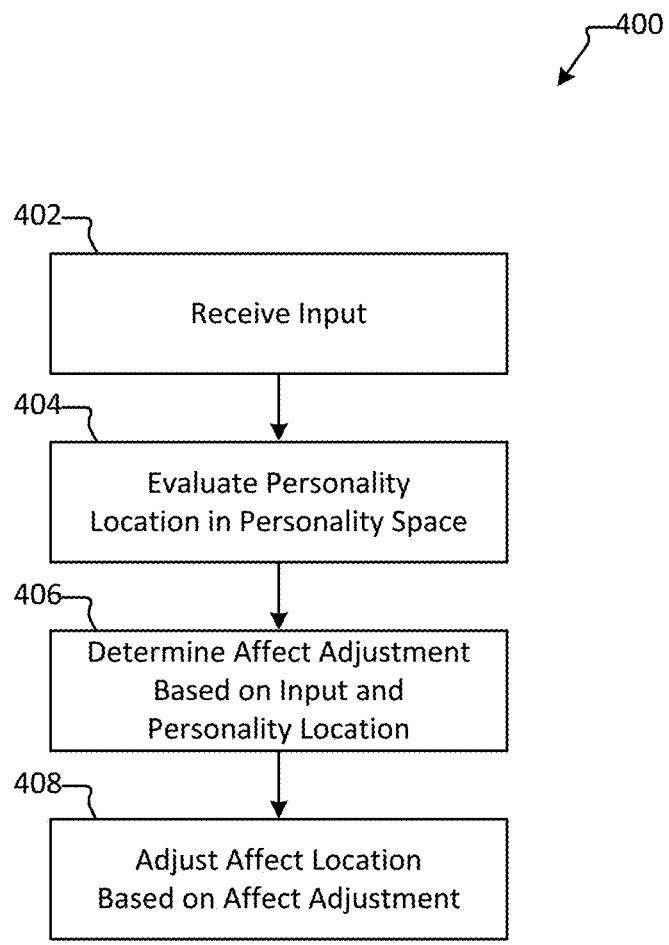
FIG. 4A depicts an example of a method for determining an affective state for a robot.

FIG. 4A depicts an example of a method 400 for determining an affective state for a robot. As described above, the affective state may be represented by an affect location in an affect space. In some examples, the method 400 may be performed by an affect definition engine, such as the affect definition engine 103 in FIG. 1B. In some examples, the method 400 may be performed periodically or in response to the occurrence of an event, among other examples. The method 400 begins at operation 402, where an input is received. In an example, the received input may be an interaction with a user or another device, an environmental condition, audio input, video input, text input, or information indicating a response or expression by the robot. In some examples, the received input may be detected by one or more sensors of the robot, or may be received at a user interface of an external device. While example inputs are described herein, it will be appreciated that any of a variety of other inputs may be received. Further, it will be appreciated that the method 400 is described with respect to one input for simplicity and that similar techniques may be used to determine an affective state based on multiple inputs.

At operation 404, a personality location in a personality space may be evaluated. In some examples, the personality may be defined by a personality definition engine, such as the personality definition engine 102 in FIG. 1B. As described above, the personality space may be a unidimensional or multidimensional space, such that the personality location may be based on one or more factors associated with the dimensions of the personality space.

Flow progresses to operation 406, where an affect adjustment may be determined based on the input and the personality location. Any of a variety of techniques may be used to determine the affect adjustment. An example high-level equation is provided below.

$$\alpha_{t+1} = f(\alpha_t | \theta, \rho)$$

In an example, $\alpha_t$ and $\alpha_{t+1}$ may represent the affective state (e.g., as may be represented by affect locations) of a robot at times t and t+1 respectively. Further, $\theta$ may represent one or more inputs, while $\rho$ may represent personality factors. Thus, the affective state of the robot at time t+1 is a function of the affective state of the robot at time t, given one or more received inputs ($\theta$) and the personality of the robot ($\rho$). It will be appreciated that this equation is provided as an example, and other techniques may be used to determine the affect location for a robot based on one or more received inputs.

For example, an anchor location may be generated for the received input in an affect space for the robot. The anchor location may be generated based on attributes of the input (e.g., the type of input, the manner in which the input was received, relating to the content of the input, etc.), so as to map the input to a location in the affect space. In some examples, at least a part of the mapping may be specific to the robot (e.g., based on a personal preference of the robot, based on previous inputs, etc.). It will be appreciated that in an example with multiple received inputs, multiple anchor locations may be generated. In some examples, multiple inputs may be used to generate a single anchor location. In other examples, multiple anchor locations may be generated based on a single received input.

In an example with one or more anchor locations, the affect adjustment may be determined based on the anchor locations. For example, an average affect location within the affect space may be generated, such that the aver affect location may be used to adjust the affect location accordingly. In another example, any of a variety of models may be used, as is discussed below with respect to FIGS. 4B and 4C. In some examples, additional anchor locations may be used to determine the personality adjustment, such as an anchor location representing a mood for the robot (e.g., an average affective state for the robot over a given time period, a lingering sentiment resulting from an input that is no longer present, etc.). In another example, the determination may comprise evaluating the previous affective state for the robot, such that the determined affective state may shift in a continuous manner.

In other examples, the affect adjustment may be determined based on a more direct analysis of the received input (e.g., without the use of a model). For example, an input may be used to determine a "force," which may be used to determine the affect adjustment. In some examples, a probabilistic model may be used, wherein a probability distribution may be defined within the affect space. For example, the probability distribution may be a zero-mean Gaussian distribution centered on the current affect location in the affect space. The received input may be mapped to one or more features of the probability distribution (e.g., an input may affect the variance of the pleasure factor, the variance of the arousal factor, etc.), such that one or more factors of the affect location are varied according to the probability distribution. In examples, only a subset of inputs may be used according to aspects disclosed herein, such that inputs may be randomly or programmatically selected or filtered when determining the affect location in the affect space. While example techniques for generating an affect location in affect space based on one or more inputs are discussed herein, it will be appreciated that any of a variety of other techniques may be used.

At operation 408, the affect location may be adjusted based on the affect adjustment determined at operation 406. For example, the current affect location may be adjusted in a continuous unidimensional or multidimensional space, such as an affect space. The adjusted affect location may subsequently be used to determine an expression for the robot, according to aspects disclosed herein. Flow terminates at operation 408.

Figure 4C:
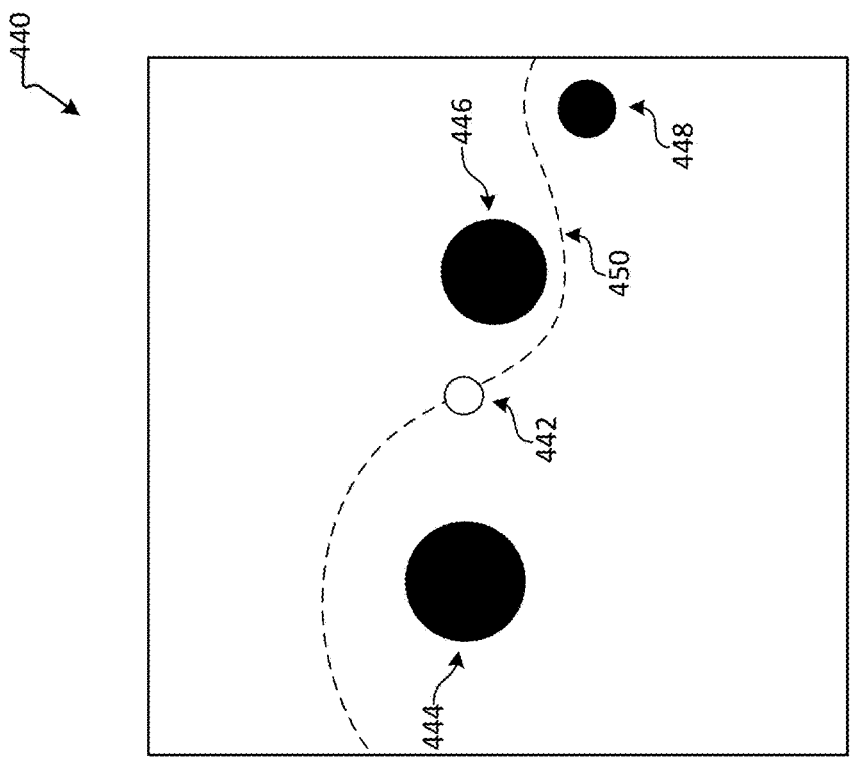
FIGS. 4B-4C depict example models for determining an affective state for a robot.
Figure 4B:
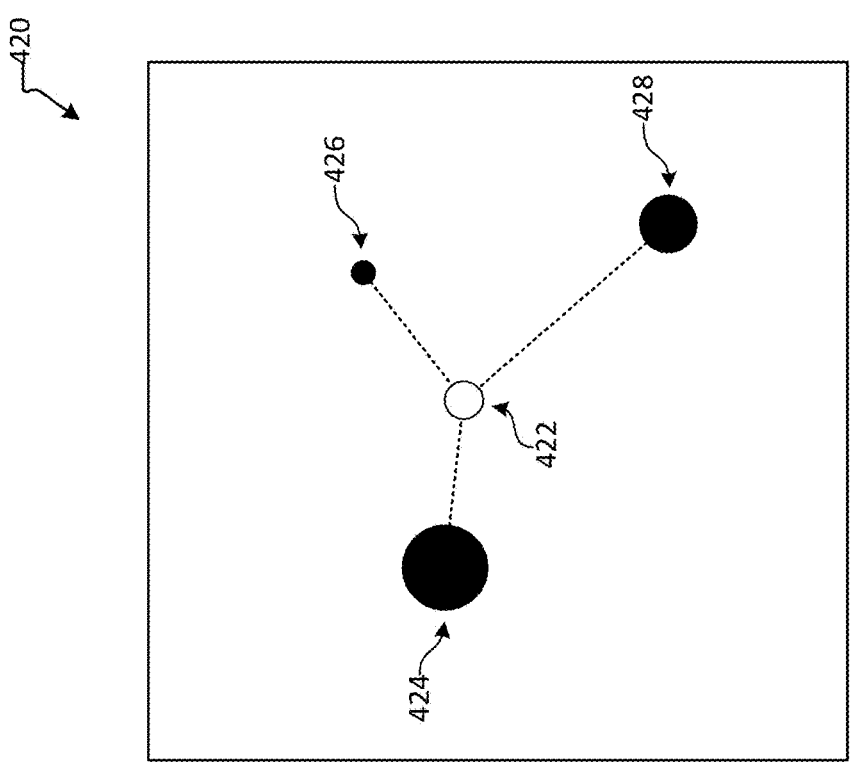

FIGS. 4B-4C depict example models 420 and 440 for determining an affective state for a robot. In some examples, the example models 420 and/or 440 may be used by an affect definition engine to define the affective state of a robot, such as the affect definition engine 103. In other examples, the example models 420 and/or 440 may be used as part of a method for determining an affective state for a robot, such as the method 400 as was described above with respect to FIG. 4A.

With reference to FIG. 4B, example model 420 comprises anchor locations 424, 426, and 428. Each of anchor locations 424-428 may represent a received input mapped to an affect space, or may represent a mood or other anchor location according to aspects disclosed herein. Affect location 422 is illustrated as a location between anchor points 424-428, and may be an affect location in the affect space, which represents an affective state for a robot. As illustrated, the dashed lines between affect location 422 and anchor locations 424-428 may be simulated springs, such that each spring has a spring constant and each of anchor locations 424-428 has a weight. In an example, each spring constant and/or weight may be determined based on an aspect of the personality of the robot, which may be a location in a personality space, as described above. In some examples, additional simulated relationships may exist between affect location 422 and anchor locations 424-428, including, but not limited to dampers or fixed bars.

Turning to FIG. 4C, example model 440 comprises anchor locations 444, 446, and 448, as well as affect location 442. Example model 440 may model anchor locations 444-448 and affect location 442 as gravitational bodies, wherein the gravity of each entity may have an effect on affect location 442. Path 450 is provided as an illustration of the past and future trajectory of affect location 442. Anchor locations 444-448 and/or affect location 442 may each have masses and other attributes that may be varied according to the personality of the robot. As compared to example model 420, example model 440 may provide an affect location that is in flux, as the simulated system may not have an equilibrium point, unlike example model 420. It will be appreciated that example models 420 and 440 are provided for illustrative purposes only, and are not intended to limit the scope of the present disclosure.

While examples are described herein with respect to continuous personality, affect, and action spaces, it will be appreciated that such spaces may have any of a variety of other attributes. In some examples, at least one of the spaces may be discrete, wherein a set of specific locations may be used to represent the space. In other examples, rather than being an infinite space, the space may be bounded or otherwise restricted to a certain region.

Figure 5:
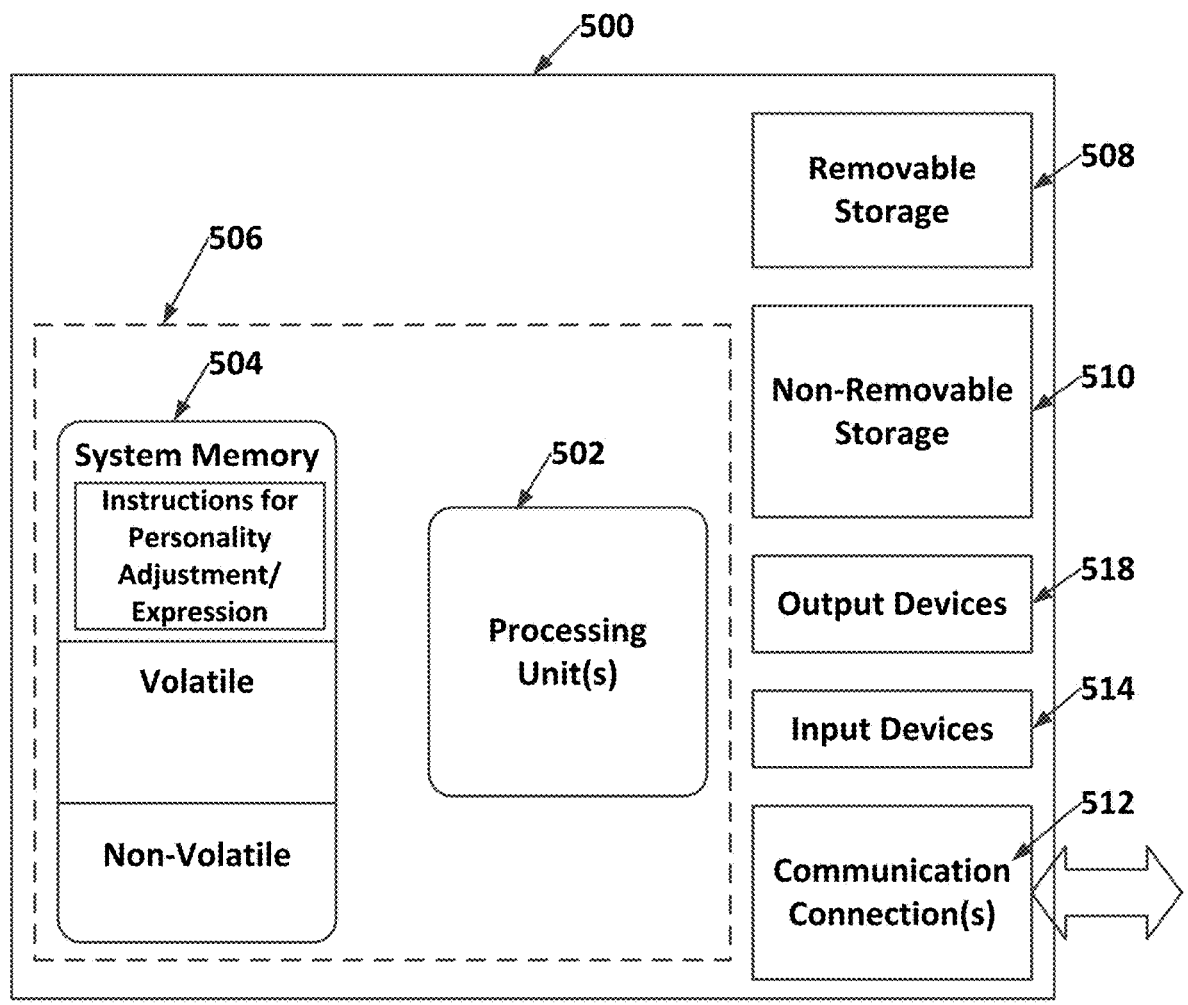
FIG. 5 illustrates one example of a suitable operating environment in which one or more of the present embodiments may be implemented.

FIG. 5 illustrates another example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (instructions to perform the personality adjustment and/or expression as described herein) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication edia. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

As will be understood from the foregoing disclosure, one aspect of the technology relates to a robotic device comprising: at least one processor; and memory encoding computer executable instructions that, when executed by the at least one processor, perform a method. The method comprises: receiving an input at the robotic device; generating, in an affect space, an anchor location for the input based on a personality location in a personality space for the robotic device; determining, based on the anchor location, an affect location in the affect space; and storing the determined affect location as an affective state for the robotic device. In an example, the method further comprises: identifying a class of expressions from an action space for the robotic device; determining, based on the affect location, an expression from the class of expressions; and performing, by the robotic device, the determined expression. In another example, determining the expression from the class of expressions further comprises adapting the determined expression based on the affect location. In a further example, the method further comprises: receiving a second input; determining that the second input is associated with the determined expression; determining a personality adjustment based on the second input and the affective state; and adjusting the personality location in the personality space for the robotic device. In yet another example, determining, based on the anchor location, an affect location further comprises evaluating an anchor location associated with a mood of the robotic device. In a further still example, at least one of the personality space and the affect space is a continuous multidimensional space. In another example, determining the affect location comprises an evaluation of multiple anchor locations in the affect space, and wherein the multiple anchor locations are each associated with at least one of a plurality of received inputs.

In another aspect, the technology relates to a computing device comprising: at least one processor; and memory encoding computer executable instructions that, when executed by the at least one processor, perform a method. The method comprises: receiving an input at the computing device; determining, based on the received input, an affect location in an affect space, wherein the affect location is determined based on a personality location in a personality space; identifying a class of expressions from an action space; determining, based on the affect location, an expression from the class of expressions; and performing, by the computing device, the determined expression. In an example, determining the expression from the class of expressions further comprises adapting the determined expression based on the affect location. In another example, the method further comprises: receiving a second input; determining that the second input is associated with the determined expression; determining a personality adjustment based on the second input and the affective state; and adjusting the personality location in the personality space. In a further example, least one of the personality space and the affect space is a continuous multidimensional space. In yet another example, determining the affect location comprises evaluating one or more anchor locations in the affect space, and wherein the one or more anchor locations are associated with at least one of a plurality of received inputs. In a further still example, determining the affect location further comprises evaluating an anchor location associated with a mood of the computing device.

In another aspect, the technology relates to a method for determining an affective state by a computing device. The method comprises: receiving an input at the computing device; generating, in an affect space, an anchor location for the input based on a personality location in a personality space for the computing device; determining, based on the anchor location, an affect location in the affect space; and storing the determined affect location as an affective state for the computing device. In an example, the method further comprises: identifying a class of expressions from an action space; determining, based on the affect location, an expression from the class of expressions; and performing, by the computing device, the determined expression. In another example, determining the expression from the class of expressions further comprises adapting the determined expression based on the affect location. In a further example, the method further comprises: receiving a second input; determining that the second input is associated with the determined expression; determining a personality adjustment based on the second input and the affective state; and adjusting the personality location in the personality space. In yet another example, determining, based on the anchor location, an affect location further comprises evaluating an anchor location associated with a mood of the computing device. In a further still example, least one of the personality space and the affect space is a continuous multidimensional space. In another example, determining the affect location comprises an evaluation of multiple anchor locations in the affect space, and wherein the multiple anchor locations are each associated with at least one of a plurality of received inputs.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A robotic device comprising:
   at least one processor; and
   memory encoding computer executable instructions that, when executed by the at least one processor, perform a method comprising:
      receiving an input at the robotic device;
      generating, in an affect space, an anchor location for the input based on a personality location in a personality space for the robotic device;
      determining, based on the anchor location, an affect location in the affect space; and
      storing the determined affect location as an affective state for the robotic device.

2. The robotic device of claim 1, wherein the method further comprises:
   identifying a class of expressions from an action space for the robotic device;
   determining, based on the affect location, an expression from the class of expressions; and
   performing, by the robotic device, the determined expression.

3. The robotic device of claim 2, wherein determining the expression from the class of expressions further comprises adapting the determined expression based on the affect location.

4. The robotic device of claim 2, wherein the method further comprises:
   receiving a second input;
   determining that the second input is associated with the determined expression;
   determining a personality adjustment based on the second input and the affective state; and
   adjusting the personality location in the personality space for the robotic device.

5. The robotic device of claim 1, wherein determining, based on the anchor location, an affect location further comprises evaluating an anchor location associated with a mood of the robotic device.

6. The robotic device of claim 1, wherein at least one of the personality space and the affect space is a continuous multidimensional space.

7. The robotic device of claim 1, wherein determining the affect location comprises an evaluation of multiple anchor locations in the affect space, and wherein the multiple anchor locations are each associated with at least one of a plurality of received inputs.

8. A computing device comprising:
   at least one processor; and memory encoding computer executable instructions that, when executed by the at least one processor, perform a method comprising:
- receiving an input at the computing device;
- determining, based on the received input, an affect location in an affect space, wherein the affect location is determined based on a personality location in a personality space;
- identifying a class of expressions from an action space;
- determining, based on the affect location, an expression from the class of expressions; and
- performing, by the computing device, the determined expression.

9. The computing device of claim 8, wherein determining the expression from the class of expressions further comprises adapting the determined expression based on the affect location.

10. The computing device of claim 8, wherein the method further comprises:
- receiving a second input;
- determining that the second input is associated with the determined expression;
- determining a personality adjustment based on the second input and the affective state; and
- adjusting the personality location in the personality space.

11. The computing device of claim 8, wherein at least one of the personality space and the affect space is a continuous multidimensional space.

12. The computing device of claim 8, wherein determining the affect location comprises evaluating one or more anchor locations in the affect space, and wherein the one or more anchor locations are associated with at least one of a plurality of received inputs.

13. The computing device of claim 12, wherein determining the affect location further comprises evaluating an anchor location associated with a mood of the computing device.

14. A method for determining an affective state by a computing device, comprising:
- receiving an input at the computing device;
- generating, in an affect space, an anchor location for the input based on a personality location in a personality space for the computing device;
- determining, based on the anchor location, an affect location in the affect space; and
- storing the determined affect location as an affective state for the computing device.

15. The method of claim 14, further comprising:
- identifying a class of expressions from an action space;
- determining, based on the affect location, an expression from the class of expressions; and
- performing, by the computing device, the determined expression.

16. The method of claim 15, wherein determining the expression from the class of expressions further comprises adapting the determined expression based on the affect location.

17. The method of claim 15, further comprising:
- receiving a second input;
- determining that the second input is associated with the determined expression;
- determining a personality adjustment based on the second input and the affective state; and
- adjusting the personality location in the personality space.

18. The method of claim 14, wherein determining, based on the anchor location, an affect location further comprises evaluating an anchor location associated with a mood of the computing device.

19. The method of claim 14, wherein at least one of the personality space and the affect space is a continuous multidimensional space.

20. The method of claim 14, wherein determining the affect location comprises an evaluation of multiple anchor locations in the affect space, and wherein the multiple anchor locations are each associated with at least one of a plurality of received inputs.

* * * * *